United States Patent Office 3,278,503
Patented Oct. 11, 1966

3,278,503
COPOLYMERIZATION WITH MONOMER COMPLEXES
George E. Serniuk, Roselle, and Robert M. Thomas, Mountainside, N.J., assignors to Esso Research and Engineering Company, a corporation of Delaware
No Drawing. Filed Mar. 29, 1965, Ser. No. 443,641
9 Claims. (Cl. 260—82.5)

The present invention deals with an improved method for forming useful polymeric products. More particularly, it deals with an improved process for conducting a polymerization process wherein a first monomer that contains strongly negative groups and responds to free radical initiation but not Friedel-Crafts type polymerization is complexed with a Friedel-Crafts halide and the complexed monomer copolymerized in the presence of a free radical initiator with a second olefin monomer that responds to Friedel-Crafts polymerization.

The present application is a continuation-in-part of Serial No. 158,120, filed December 8, 1961, now abandoned, in the names of George E. Serniuk and Robert M. Thomas, which is itself a continuation-in-part of Serial No. 92,457, filed March 1, 1961, and now Patent No. 3,183,217, for the same applicants. The aforesaid applications are incorporated herein by reference in their entirety; however, as much of them as is necessary to understand the present invention will be repeated.

In the above- identified patent applications, new means for copolymerization have been taught. A first monomer which contains strongly negative groups responding to free radical but not Friedel-Crafts polymerization, e.g., a typically polar vinyl monomer such as acrylonitrile, is complexed with a Friedel-Crafts halide and copolymerized with a second monomer which responds to Friedel-Crafts but not free radical polymerization in the presence of a free radical initiator. In carrying out this process, difficulty has been encountered in maintaining continuous operations. Polar vinyl monomers complexed with metal halides react rapidly with monoolefins containing hydroperoxides or added free radical generators to form solid or highly viscous products which are difficult to stir or mix. Consequently, the reaction mixture has tended to separate into a bottom complex layer and a top hydrocarbon layer with an ultimate loss in catalyst efficiency. Due to the rapid formation of solid products, the reaction has to be terminated prematurely because the solid product freezes the stirrer. This has sharply limited the feasibility of continuous operations.

It was thought that the above problems could be overcome by the use of various conventional oxygen- and nitrogen-containing solvents, or hydrocarbons and halogenated hydrcarbon diluents. However, it was found that such solvents as hexane, benzene, cyclohexane, and chloroform did not solvate the product and thus did not solve this problem, whereas solvents such as ethyl acetate, dimethyl formamide, and nitromethane interfered with the reaction.

It has now been found that continuous operation of such a polymerization system with good mixing of reactants can be achieved by the use of a substantial excess of polar vinyl monomer over that which is theoretically necessary merely to complex with the metal halide catalyst. More specifically, the molar ratio of polar vinyl monomer to metal halide catalyst is at least 2, e.g., 2 to 150, and preferably falls within the range of 5 to 20. In general, the greater the number of carbon atoms in the monomer to be copolymerized with the polar vinyl monomer, the greater this ratio should be. Thus, for example, when using a $C_2$ to $C_6$ olefin, the molar ratio of polar vinyl monomer to metal halide catalyst is preferably 5 to 10, whereas the molar ratio is preferably 12 to 20 when utilizing a $C_8$ to $C_{18}$ olefin.

The use of an excess of the polar vinyl monomer offers important advantages. It not only solvates the reaction medium, thus enabling continuous operation, but increases the yield based on catalyst. Moreover, in cases where the second monomer does not respond to free radical polymerization and a vinyl nitrile is used as the polar monomer, the use of an excess of the polar vinyl monomer effects these advantages without changing the nature of the polymer product obtained.

These are very unusual results. First, the use of an excess of the monomer to be copolymerized with the polar vinyl monomer does not solvate the reaction. Secondly, in conventional catalyst systems, a large increase in the concentration of one of the monomers would drastically change the nature of the resulting copolymer. Comparing various polymerization systems having a molar ratio of vinyl nitrile monomer to comonomer of 2 to 1, as for example in the system acrylonitrile, 2-methyl-1-pentene, the use of sunlight alone as a catalyst would give a copolymer of 75% acrylonitrile; a persulfate emulsion polymerization would yield a 72% acrylonitrile copolymer; and a system employing the metal halide-polar vinyl monomer complex copolymerized with an olefin in the presence of a peroxide would yield a copolymer containing about 56% acrylonitrile. A 5-fold increase in the concentration of acrylonitrile in accordance with the present invention has little or no effect on the acrylonitrile content of the resulting copolymer in the latter system, whereas such a 5-fold increase would result in a 10% increase in acrylonitrile content in the former polymerization systems.

The present process offers particularly advantageous results when the polar vinyl monomer is to be copolymerized with a conjugated $C_5$ to $C_{12}$ diolefin such as isoprene, piperylene, butadiene, and a conjugated triolefin such as alloocimene. These systems heretofore were extremely reactive and difficult to control, and the product recovered therefrom often of little utility. In accordance with the present invention, not only has better process control been ensured but apparently new types of polar vinyl monomer-conjugated diolefin polymers, e.g., acrylonitrile-isoprene copolymer, have been obtained. Such new products have been found to be soluble in acetone and chloroform and to have a rubbery nature, thus finding ready application as a plastic and as a plasticizer for nitrile-containing resins.

Non-conjugated diolefins also may be used in the practice of this invention. By way of example, 2,5-dimethyl-2,5-hexadiene may be copolymerized with the complexes disclosed to form a useful resinous product.

With reference to suitable monomers for the practice of the present invention, the first monomer that contains strongly negative groups responding to free radical but not Friedel-Crafts polymerization can be characterized as typically polar vinyl monomers containing strongly negative groups which do not promote electron pair release at the double bond, e.g., vinyl halides, vinylidene halides, vinyl esters, acrylic esters, and methacrylic esters; see "Textbook of Polymer Chemistry" by F. W. Billmeyer, Jr., Interscience Publishers, 1957, pages 263–264.

Suitable examples of the vinylic halides recited hereinabove include: vinyl chloride, vinyl bromide, vinyl fluoride, vinyl iodide, vinylidene chloride and vinylidene bromide. Examples of vinyl esters include the esters of $C_2$–$C_8$ monocarboxylic acids, such as vinyl acetate, vinyl propionate, vinyl butyrate, vinyl caproate and vinyl caprylate. Preferred species of the esters of acrylic and methacrylic acid include the esters of $C_1$–$C_8$ alcohols, with the esters of the $C_1$–$C_4$ alcohols being more preferred.

Representative examples include methyl acrylate, ethyl acrylate, butyl acrylate, hexyl acrylate, octyl acrylate, methyl methacrylate, ethyl methacrylate, propyl methacrylate, pentyl methacrylate, heptyl methacrylate and their homologous derivatives. Especially effective and desirable are acrylonitrile, methacrylonitrile, acrolein, acrylic acid, methacrylic acid, methyl methacrylate and vinyl acetate.

The second monomers may, in one embodiment of the present invention, be monomers which respond to Friedel-Crafts but not free radical polymerization. Such monomers contain groups promoting the release of electrons at the double bonds and are predominantly non-polar olefins or only mildly substituted olefins. Examples thereof are the following: isobutylene, alpha methyl styrene, isopropenyl toluene, and vinyl ethers. Particularly effective examples of these types of olefins are: ethylene, propylene, isobutylene, hexene-1, and 2-methyl-1-pentene.

Alternatively, as discussed above, particularly unusual results are obtained when a conjugated $C_5$ to $C_{12}$ diolefin is employed as the second monomer.

The molar ratio of the polar vinyl monomer to the second monomer will normally be in the range of about 1 to 50, preferably 1 to 10. As noted previously, the excess polar vinyl monomer not only acts as a reactant but serves as a solvent for the reaction medium and polymer product.

Friedel-Crafts halides are those which form a complex with the indicated polar vinyl monomer such as, for example, through a coordinate bond. Typical metal halides include zinc chloride, aluminum chloride, ferric chloride, cadmium chloride, boron trifluoride, etc. While the chlorides are normally preferred, the bromides, iodides, and fluorides of the following metals can also be employed: Cu, In, Ti, Zr, Sn, V, Cr, Mo, W, Mn, Co, Ni, Pd, Pt and Os. The halides may be first complexed with the monomer and the other monomer, containing the initiator, then added, or if desired, the metal halide may be added directly to the mixture of monomers and initiator.

The free radical initiator employed in the present process may be any of a wide variety known in the art. Examples thereof are: benzoyl peroxide, cumene hydroperoxide, peroxidized butyl ether, azobisisobutyronitrile, gamma radiation, etc. Metal alkyl free radical generators such as boron alkyls and aluminum alkyls, e.g., aluminum triethyl, can also be employed. The chemical free radical initiators are utilized in an amount from 0.001 to 5.0 wt. percent based on the polar monomer.

Polymerization temperatures are generally in the range of about −78 to 175° C. Pressures may range from 1 to 1000 atmospheres with 1 to 200 atmospheres being preferred. The actual reaction times may vary between several minutes to several days depending upon the nature of the monomers used, the reaction temperatures, and the type and amount of initiator employed. The products obtained may vary from liquids (usually quite viscous) to solids. The character of these products can be influenced by the incorporation of modifying agents such as formaldehyde, acetone, or acetic acid during the synthesis. In cases wherein the second monomer is a conjugated diolefin, rubbery, tough, polymeric products which are soluble in acetone and chloroform may be obtained.

The various aspects and modifications of the present invention will be made more clearly apparent by reference to the following description and accompanying examples.

Example 1

This example illustrates the preparation of an acrylonitrile/olefin copolymer in the absence of excess acrylonitrile. One mole of acrylonitrile was employed per mole of metal halide catalyst.

A 2-liter 4-way flask fitted with a mechanical stirrer, reflux condenser, nitrogen seal, thermometer and a heating mantle was charged with 106 g. (2 moles) of acrylonitrile and 168 g. (2 moles) of hydroperoxidized 2-methyl-1-pentene. The mixture was stirred and 280 g. (2 moles) of $ZnCl_2$ were added at room temperature. Heat was applied and the temperature allowed to reach 63° C. After 3 hours of stirring, the viscous polymer mass climbed the stirrer and the reaction had to be discontinued.

The unreacted hydrocarbon layer was decanted and the polymeric product was contacted with water. Most of $ZnCl_2$ was separated and removed by repeated treatments of the polymer with water. The polymer, a light yellow colored, tough mass was dissolved in acetone and precipitated therefrom by the gradual addition of water. The solution precipitation steps were repeated. The polymer was dried for 16 hours at 60° C. under 180–200 mm. Hg pressure. A very tough and light colored product was obtained in a 51% yield based on acrylonitrile. There were obtained 0.198 g. of product per gram of metal halide. This product showed the following elemental composition: C, 76.50; H, 9.93; N, 13.53. This product could be formed into fibers.

The necessity for discontinuing the reaction prematurely due to stirring difficulty and the relatively low yield of product per gram of metal halide is to be noted.

Example 2

This example illustrates the preparation of an acrylonitrile/olefin copolymer in an excess of acrylonitrile (mole ratio of 10:1) which solvates the reaction product to give a homogeneous, fluid reaction mixture which can be easily handled in commercial equipment.

Equipment as described in Example 1 was charged with the following:

Fused $ZnCl_2$ _____ 68 g. (0.5M).
Acrylonitrile _____ 330 ml. (5M).
2-methyl-1-pentene _____ 125 ml. (1M).
Benzoyl peroxide _____ 0.1 g. (0.0041M).

The $ZnCl_2$ and acrylonitrile were stirred to form the complex and the benzoyl peroxide and olefin were then added. The air in the reactor was supplanted with nitrogen, the mixture was stirred and heat was applied. A log of the reaction follows:

| Time | Temp., °C. | Remarks and Observations |
|---|---|---|
| 1,315 | 41 | Olefin and benzoyl peroxide added, heat turned on. |
| 1,345 | 57 | Reaction mixture acquiring a yellow color. |
| 1,415 | 59.5 | 0.1 g. benzoyl peroxide added, slight polymer on walls. |
| 1,515 | 60 | 0.1 g. benzoyl peroxide added, mixture more viscous. |
| 1,615 | 60 | 0.1 g. benzoyl peroxide added, mixture getting more viscous. |
| 1,645 | 60.5 | 0.1 g. benzoyl peroxide added. |
| 0,800 | 63.5 | Reaction mixture mobile, two phases, 0.1 g. benzoyl peroxide added. |
| 0,900 | 63.7 | 0.1 g. benzoyl peroxide added, very viscous, orange color. |
| 1,000 | 62 | 0.1 g. benzoyl peroxide added, viscosity increasing. |
| 1,040 | 62 | Very viscous reaction mixture. |
| 1,100 | 62 | 0.1 g. benzoyl peroxide added, very viscous, became homogeneous. |
| 1,200 | 62.5 | 0.1 g. benzoyl peroxide added. |
| 1,305 | 63.5 | Very viscous, orange colored, homogeneous, clear, refluxing. |
| 1,420 | 64 | Heat off, no longer clear, viscous, light yellow ring on wall above liquid. |

To the cooled reaction mixture were added 250 ml. of acetone and the solution transferred to a separatory funnel. Water, 100 ml., was added and the mixture was shaken. On standing a short time, a bottom aqueous layer separated and was drawn off. A 50/50 acetone-water mixture, 100 ml., was added and the shaking, standing and removal of the bottom layer were repeated. Two such treatments were effected. The three water layers were combined and evaporated and fused. There were recovered 61 g. of dark brown colored $ZnCl_2$. The polymer solution was added slowly to boiling water to strip off unreacted monomers and to remove the remainder of the $ZnCl_2$. The wet polymer was dissolved in acetone and precipitated therefrom with methyl alcohol. There were recovered 72 g. of a tough, yellow colored product which contained 13.72% N which can be calculated to correspond to a combined acrylonitrile content of 52%. The grams of polymer/gram of metal halide corresponds to 1.06.

As compared with Example 1, the ease of conducting the polymerization reaction over a long period of time by application of the present process is to be noted. Thus, the present invention permits the use of the continuous polymerization process. Comparison with the product of Example 1 demonstrates that the use of excess acrylonitrile gave essentially no change in percentage of combined acrylonitrile in the copolymer while simultaneously markedly improving the catalyst efficiency (the grams of polymer/grams of metal halide were increased from 0.198 to 1.06).

*Example 3*

This example illustrates the preparation of a methacrylate/olefin copolymer by the process of this invention.

Equipment as described in Example 1 was charged with the following:

Methylacrylate (NaOH washed
  and distilled) _____ 430 g. (5 moles).
$ZnCl_2$ (fused) _____ 68 g. (0.5 mole).
2-methyl-1-pentene _____ 84 g. (1 mole).

The reaction mixture was stirred for 17 hours at a temperature range of 31.5 to 63.5° C. Every hour during the first seven hours, 0.1 g. of benzoyl peroxide was added. After six hours, the reaction mixture increased in viscosity. The reaction mixture was allowed to stand overnight at room temperature. On the following day, the reaction was resumed. Benzoyl peroxide was added during the first three hours in quantities of 0.1 g. At the end of fifteen hours, the reaction mixture became homogeneous and highly viscous. The reaction was discontinued after seventeen hours.

The reaction mixture was diluted with 400 ml. of acetone and 200 ml. of water. After shaking, the mixture separated into a top polymer layer and an aqueous-acetone layer. After removal of the bottom aqueous-acetone layer the polymer layer was washed with water to remove $ZnCl_2$. The viscous polymer layer was treated with methyl alcohol to precipitate the polymer and to remove unreacted monomer. The precipitated polymer was washed repeatedly with fresh portions of methyl alcohol. The washed product was freed of residual solvents by heating it for 16 hours at 60° C. under a pressure of 180–200 mm. Hg.

The product was a colorless, tough, flexible polymer weighing 166 g. This corresponds to 2.44 g. of product per gram of metal halide. The product showed an oxygen content of 33.42% which corresponds to 90 wt. percent of combined methylacrylate in the copolymer.

As illustrated above, the present process allows methylacrylate and 2-methyl-1-pentene to be copolymerized with ease over the course of several hours without "freezing" of the reaction mixture.

*Example 4*

This example illustrates the use of vinyl acetate in the process of this invention.

Equipment as described in Example 1 was charged as follows:

$ZnCl_2$ (fused) _____ 68 g. (0.5 mole).
Vinyl acetate (distilled) _____ 430 g. (5 moles).
2-methyl-1-pentene _____ 84 g. (1 mole).
Benzoyl peroxide _____ 0.2 g. (.000825 mole).

The reaction mixture was stirred and heated. In 3¾ hours, the reaction temperature rose from 25 to 73° C. At the end of the third hour, the reaction mixture became dark colored and viscous. After an additional ¾ of an hour, the reaction mixture was easily transferred to a separatory funnel and washed with water until the $ZnCl_2$ was removed. The unreacted monomers were removed in a vacuum oven. The dark colored liquid product weighed 123 g. Polymer production was 1.81 g./g. of metal halide. The oxygen content of the product is 19.99% which corresponds to a combined vinyl acetate content of 53.6 wt. percent.

This example again illustrates the good control of polymerization conditions afforded by the practice of the present invention.

*Example 5*

This example contrasts the preparation of an acrylonitrile-isoprene copolymer by the practice of the present invention with the copolymer formed without the use of excess polar vinyl monomer.

*Run A.*—Equipment as described in Example 1 was charged with 249.1 g. of $ZnCl_2$ (1.83 moles) and 121 ml. of acrylonitrile (1.83 moles), i.e., no excess of polar vinyl monomer. After stirring for 2¼ hours, the acrylonitrile and $ZnCl_2$ were complexed. A total of 5.7 moles of isoprene was added and the reaction mixture was stirred. After 24 minutes, a rapid reaction ensued with the formation of polymer which wrapped around and bound the stirrer and for this reason the reaction was discontinued. After the initial rapid, exothermic reaction there appeared to be no further activity. The supernatant liquid was decanted and distilled. The liquid boiled at 34° C. which corresponds to the boiling point of isoprene. The solid product was removed, washed with water and dried. The recovered product weighed 11.5 g. The product was insoluble in chloroform, acetone, or hydrocarbons.

The preparation of a soluble useful product from a conjugated diolefin according to the process of this invention is illustrated by the following experiment.

*Run B.*—The equipment of Example 1 was charged with 68 g. (0.5 mole) of $ZnCl_2$ and 5 moles of acrylonitrile. When the $ZnCl_2$ was completely complexed, 100 ml. of distilled isoprene (1 mole) and 0.025 g. of 2,2′-azobis (2-methyl-propionitrile) were added. The reaction mixture was stirred and heated. After 110 minutes, 0.025 g. of azobis (2-methylpropionitrile) were added. After 215 minutes, the reaction mixture became highly viscous. After 10½ hours the reaction was discontinued.

The highly viscous reaction mixture, which was clear and homogeneous, was transferred to a beaker and the product was precipitated with methanol. The supernatant liquids were decanted and the precipitated polymer was dissolved in acetone and again precipitated with methanol. A small amount of 2,6-ditertiary butyl cresol was added before the final precipitation of the product. After drying, the product weighed 20.41 g. The product showed a nitrogen content of 12.71% which corresponds to a combined acrylonitrile content of 48.2%. This product is rubbery and tough, and finds application as a plastic and as a plasticizer for nitrile-containing resins.

Comparisons of Runs A and B demonstrate the process control offered by the practice of the present invention. Additionally, the unique nature of the product obtained by copolymerization of conjugated diolefin with the excess of acrylonitrile in accordance with the present invention is illustrated by its solubility in acetone, chloroform and nitromethane. Rigid acrylonitrile-containing polymers are readily plasticized when this product is incorporated therein. The incorporation of this product into other polymers can be effected in several ways, one of which includes handling on conventional rubber mills or in plastic processing equipment.

*Examples 6 and 7*

The following data show that as the mole ratio of acrylonitrile to zinc chloride approaches one, the efficiency of the catalyst decreases sharply. In the system where the mole ratio of acrylonitrile to zinc chloride is one, the polymer forms rapidly and results in an immobile product which cannot be stirred. This makes it impossible to realize the maximum efficiency from the catalyst.

|  | Run | | |
|---|---|---|---|
|  | 1 | 2 | 3 |
| Acrylonitrile, g | 106 | 106 | 106 |
| 2-methyl-1-pentene, g | 168 | 168 | 168 |
| Zinc chloride, g | 14 | 27.2 | 280 |
| Mole ratio acrylonitrile/2-methyl-1-pentene/zinc chloride | 20-20-1 | 10-10-1 | 1-1-1 |
| Reaction temperature, °C | 24-57 | 30-57.5 | 30-63 |
| Reaction time, hrs | 6 | 4 | 3 |
| Product, g | 9 | 12 | 53.5 |
| Product yield, percent on acrylonitrile | 8.5 | 11.8 | 50.5 |
| Catalyst efficiency g. polymer/g. catalyst | 0.643 | 0.441 | 0.191 |
| Product analysis: | | | |
| N, percent | 14.18 | 12.52 | 13.39 |
| Acrylonitrile content, percent | 53.6 | 47.5 | 50.6 |

Various modifications to the present invention will suggest themselves to those skilled in the art. The products produced according to this invention can be used as chemical intermediates, molding compounds, fibers, elastomers, surface coatings, and cement for glass and metals.

In summary, in accordance with the present invention, means for continuous polymerization with improved product yields and catalyst efficiencies are taught. In the cases where the second monomer responds to Friedel-Crafts polymerization but not free radical polymerization and the first monomer is a vinyl nitrile, these results are obtained with substantially no effect on the nature of the product as compared with use of smaller quantities of polar vinyl monomer. When the second monomer is a conjugated diolefin, the present invention affords not only process control features but means for obtaining unique polymeric products which are soluble in a variety of solvents.

Having described the present invention, that which is sought to be protected is set forth in the following claims.

What is claimed is:

1. A process for copolymerizing a polar vinyl monomer which responds to free radical polymerization with a second olefinic monomer which comprises, admixing (A) a molar excess of a polar vinyl monomer selected from the group consisting of vinyl halides, vinylidene halides, acrylic esters, methacrylic acid, methacrylic esters, vinyl acetate, acrylonitrile, methacrylonitrile, acrylic acid and acrolein with a Friedel-Crafts halide to form a polar vinyl monomer-metal halide equimolar complex, the mole ratio of said polar vinyl monomer to Friedel-Crafts halide being at least 2:1, and (B) copolymerizing, under anhydrous conditions, said complex with a second olefinic monomer selected from the group consisting of $C_5-C_{12}$ diolefins and alloocimene in the presence of a free radical initiator and said excess of polar vinyl monomer at a temperature of between about $-78°$ C. and about $175°$ C., the mole ratio of said polar vinyl monomer to said second olefinic monomer being between about 1:1 and about 50:1.

2. A process according to claim 1 wherein the amount of free radical initiator is between about 0.001 and about 5.0 wt. percent based on said polar vinyl monomer.

3. A process according to claim 1 wherein the $C_5-C_{12}$ diolefins are conjugated diolefins.

4. A process according to claim 1 wherein the Friedel-Crafts halide is zinc chloride.

5. A process according to claim 1 wherein the free radical initiator is selected from the group consisting of benzoyl peroxide, cumene hydroperoxide, peroxidized butyl ether, azobisisobutyronitrile and gamma radiation.

6. A process according to claim 1 in which the mole ratio of polar vinyl monomer to Friedel-Crafts catalyst is from about 2:1 to about 150:1.

7. A process according to claim 1, wherein the mole ratio of polar vinyl monomer to Friedel-Crafts catalyst is from about 5:1 to about 20:1.

8. A process according to claim 1, wherein the mole ratio of the polar vinyl monomer to the second olefinic monomer is from about 1:1 to about 10:1.

9. A process comprising admixing a molar excess of acrylonitrile with fused zinc chloride to form a polar vinyl monomer-metal halide equimolar complex, the mole ratio of acrylonitrile to zinc chloride being about 10:1, adding isoprene to the said complex, the mole ratio of isoprene to acrylonitrile being about 1:5, then copolymerizing the mixture at a temperature of from about 0° C. to 100° C., under anhydrous conditions, and in the presence of a minor amount of 2,2′-azobis(2-methylpropionitrile) and said excess of acrylonitrile.

No references cited.

JOSEPH L. SCHOFER, *Primary Examiner.*

H. I. CANTOR, *Assistant Examiner.*